United States Patent

[11] 3,609,393

[72] Inventor Ying L. Yao
Mahopac, N.Y.

[21] Appl. No. 837,754
[22] Filed June 30, 1969
[45] Patented Sept. 28, 1971
[73] Assignee International Business Machines Corporation
Armonk, N.Y.

[54] BIDIRECTIONAL DYNAMIC SHIFT REGISTER
24 Claims, 9 Drawing Figs.

[52] U.S. Cl. 307/221, 307/222, 307/246, 307/251, 328/37, 328/44
[51] Int. Cl. G11c 19/00
[50] Field of Search 307/221 C, 221, 222, 238, 246, 251, 279, 304; 328/37, 44

[56] References Cited

UNITED STATES PATENTS

| | | | |
|---|---|---|---|
| 2,842,682 | 7/1958 | Clapper | 307/222 X |
| 2,922,985 | 1/1960 | Crawford | 328/37 X |
| 3,243,600 | 3/1966 | Fatz | 328/44 X |
| 3,297,950 | 1/1967 | Lee | 307/221 X |
| 3,348,069 | 10/1967 | Petschauer | 328/37 X |
| 3,500,064 | 3/1970 | Wong | 307/222 |

*Primary Examiner*—Stanley T. Krawczewicz
*Attorneys*—Hanifin and Jancin and Jackson E. Stanland

ABSTRACT: A bidirectional dynamic shift register using MOSFET's. Each stage of the shift register contains sections having storage elements for retention of data. Bidirectional means interconnect the sections and also adjacent stages. The bidirectional means controls the direction of flow of data by control of the status of any storage element in accordance with the status of the preceding storage element. That is, the state of the transferee storage element is determined by the state of the transferor storage element. Overlapping or nonoverlapping clock pulses can be used, as well as any number of clock phases.

INVENTOR
YING L. YAO

BY J. E. Stewart
AGENT

BIDIRECTIONAL DYNAMIC SHIFT REGISTER

BACKGROUND OF THE INVENTION

1. Field of the Invention

This invention relates to dynamic shift registers, and more particularly to a dynamic shift register which is bidirectional, i.e., which can shift data to the left or to the right.

2. Description of the Prior Art

Although bidirectional shift registers are known in the prior art, to the best of my knowledge, no bidirectional dynamic shift registers are shown in the literature. Further, no such shift registers using MOSFET's have been described.

Known bidirectional shift registers employ switching elements such as bipolar transistors. These shift registers are composed of various logic elements, such as NOR gates, which are interconnected as flip-flop circuits. Data is shifted either left or right under the control of applied clock pulses. The sequence of these clock pulses is changed when the direction of data flow is to be changed.

In these prior bidirectional shift registers, DC power is required for biasing the various logic gates in each shift register stage. The requirement of DC power puts additional power dissipation requirements on such circuits. In addition, these prior shift registers are usually in bipolar form and cannot be easily fabricated as integrated circuits without using extensive amounts of chip area.

Dynamic shift registers using MOSFET's are known, but these are not bidirectional devices. In particular, a new type of dynamic shift register having storage capability is shown in the present applicant's patent application Ser. No. 837,597 assigned to the same assignee as the present application, and filed on the same day. That copending application describes a MOSFET shift register in which data is stored in various node capacitances in each stage. When it is desired to store the data, rather than to shift it, clock pulses are applied to the circuit which electrically activate means for retaining the voltages on the node capacitances without shifting the data from one node capacitance to another. This shift register is very fast, since it is a dynamic shift register, and requires only a small amount of chip area, when fabricated in integrated circuitry.

However, the shift register of Ser. No. 837,597 does not have bidirectional shifting capability, and will shift in only one direction. Because bidirectional shift registers are useful in many computer applications, it is desirable to provide a fast, low power, dynamic shift register of small chip area, which is also bidirectional. The dynamic shift register of Ser. No. 837,597 is modified in the present application so that it is capable of shifting data both to the left and to the right, depending on the particular shifting pulses which are provided. The same number of clock pulses is utilized in both shift registers, the only requirement being that two shift pulses are rerouted when changing from a SHIFT RIGHT operation to a SHIFT LEFT operation in the instant bidirectional shift register.

The above-described shift registers are limited for many applications, due to their speed limitations, required chip area, and/or lack of bidirectionality.

Accordingly, it is a primary object of the present invention to provide a dynamic shift register having bidirectional shifting.

It is another object of the present invention to provide a dynamic shift register having bidirectional shifting, which shift register is comprised entirely of MOSFET's.

It is another object of the subject invention to provide a dynamic shift register which is bidirectional and which requires only a small chip area when fabricated in integrated circuitry.

It is still another object of the present invention to provide a dynamic shift register which is bidirectional and which operates with both overlapping and nonoverlapping clock pulses having any number of clock phases.

The foregoing and other objects, features, and advantages of the invention will be apparent from the following more particular description of the preferred embodiments of the invention, as illustrated in the accompanying drawings.

BRIEF SUMMARY OF THE INVENTION

This is a dynamic shift register which shifts data either to the left or to the right. Each shift register stage is comprised of various sections and each section contains a storage element for holding data. Between the storage elements are bidirectional means which allows data shifting in either direction. The bidirectional means is controlled by the data state of a storage element from which information is to be transferred, and by applied clock pulses. Depending on the application of particular clock pulses, data is shifted either to the left or to the right.

The bidirectional means comprises a network for shifting data to the left and another network for shifting data to the right. Each of these shifting networks operates under control of applied clock pulses. Another control to the shifting networks is the data state of a storage element. The bidirectional means conditionally regulates the state of the storage element to which information is to be transferred. It is conditional regulation because the state of the storage element to which information is to be transferred depends on the data state of the preceding storage element.

The bidirectional means comprises two shifting networks, as noted above. These shifting networks remove data on the storage element to which information is to be transferred. In a preferred embodiment, the networks are discharge paths.

Also provided are various clock pulses which control the selection of the particular networks. For instance, if data is to be shifted to the left, the clock pulses will choose only those portions of the bidirectional means which allow any storage element to control the status of the storage element on its left. If data is to be shifted to the right, the clock pulses select that portion of the bidirectional means which allows any storage element to control the status of the storage element to its right.

In general, the clock pulses electrically activate those portions of the bidirectional means which allow the status of the storage element from which information is to be transferred to control the status to the storage elements to which data is to be transferred. That is, the state of the transferor storage element always controls the state of the transferee storage element.

In a preferred emobdiment, each shift register stage is comprised of MOSFET's and the storage elements are node capacitances, largely comprised of the gate-source capacitances of a MOSFET. In the preferred embodiment, there is a bidirectional means between each node capacitance. Each such means includes a MOSFET network for shifting data to the left and a MOSFET network for shifting data to the right. The MOSFET networks operate under control of the data state of a storage element and the state of an applied clock pulse. These shifting networks provide discharge paths for the transferee storage element when the status of the transferor storage element is of a particular state. Consequently, the bidirectional means, under control of the clock pulses, either provides a discharge path for the node capacitance to which information is to be transferred or does not provide a discharge path for the node capacitance to which information is to be transferred.

Either overlapping or nonoverlapping clock pulses can be used. In addition, these clock pulses can have any number of phases. Regardless of the particular nature of the clocking provided, the bidirectional means will allow data transfer in either a right or a left direction depending upon the application of particular clock pulses. The bidirectional means allow conditional regulation of data in any section, in accordance with the data contained in the preceding section.

DESCRIPTION OF THE PREFERRED EMBODIMENT

Figure 1:
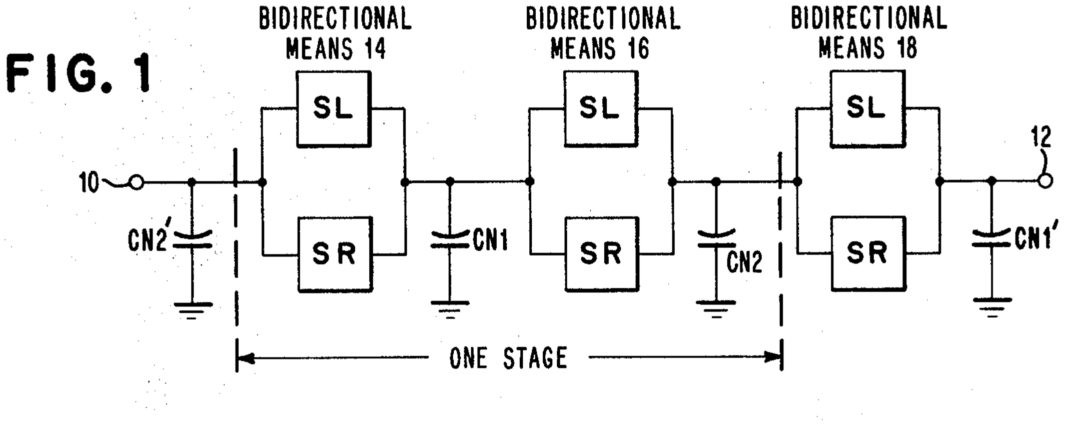
FIG. 1 is a block diagram of a dynamic bidirectional shift register according to the present invention.

Referring to FIG. 1, a bidirectional dynamic shift register is shown. In this drawing, only one complete stage is shown; however, it is to be understood any number of stages can be employed in the shift register.

Each stage comprises storage elements, such as CN1 and CN2. Interconnecting the storage elements are bidirectional means, 14, 16, 18, which means control the flow of data in either a right direction or a left direction. Although the storage elements are shown as capacitances, it is to be understood that any type of data retention device can be employed in the present invention.

A bidirectional means is comprised of two separate networks; a network to be used for the SHIFT RIGHT operation and another network to be used for the SHIFT LEFT operation. Which of these networks is used during an actual data shift depends on the particular clock pulses which are applied. Although they are not shown in FIG. 1, clock pulses are applied to each bidirectional means to select either the shift-left network or the shift-right network. These networks are designated SL and SR, respectively. The bidirectional means allows any storage element to control the data status of the storage element to which information is to be transferred. This is a conditional control, since it depends on the state of the storage element from which information is to be transferred.

The storage element CN2′ is a storage element located in the previous shift register stage, while the storage element CN1′ is a storage element located in the succeeding shift register stage. As will be noted, there is a bidirectional means located between all storage elements, so that there is a bidirectional means interconnecting various sections of any stage and also interconnecting the various stages themselves. In FIG. 1, data can be applied anywhere in the shift register; that is, data can be applied to any storage element. The terminals 10 and 12 are representative of the output of the previous shift register stage and the input to the subsequent shift register stage. Once data is entered into the shift register, it can be shifted either to the left or to the right, depending upon the application of preselected clock pulses to the bidirectional means. The clock pulses are applied to all bidirectional means 14, 16, 18 ... in order to transfer data.

Figure 2:
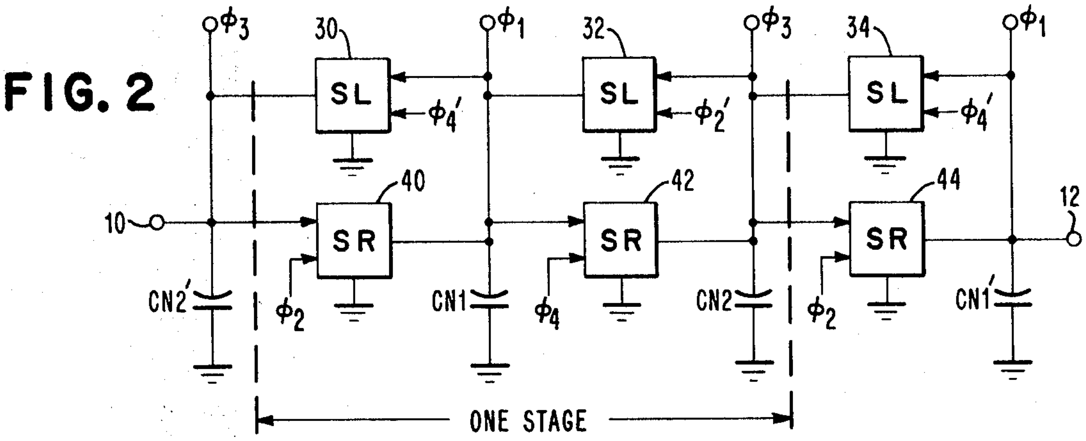
FIG. 2 is another block diagram, in more detail of the bidirectional dynamic shift register of FIG. 1.

FIG. 2 is a slightly more detailed drawing of the block diagram of FIG. 1. In FIG. 2, the interconnections between the storage elements and the bidirectional means are shown more clearly. Also shown are the clock pulses which are applied to both the storage elements and the bidirectional means. Clock pulses applied to the storage elements cause data to be placed on the storage elements, while clock pulses applied to the bidirectional means causes control of the status of succeeding storage elements by the preceding storage elements. Although it is not shown in FIG. 2, isolation means are provided between the clock pulse terminals and the storage elements. Consequently, the storage elements will only be charged by the applied clock pulses ($\Phi_1$, $\Phi_3$). The isolation means could be diodes or MOSFET's. The terms "preceding" and "succeeding" are used in this sense to indicate the direction of data flow. Data is always assumed to flow from a preceding storage element to a succeeding storage element, regardless of whether the direction of flow is to the left or to the right. In other words, data flows from a transferor storage element to a transferee storage element.

In FIG. 2, the bidirectional means 14 (FIG. 1) comprises a shift-left network 30 and a shift-right network 40. Similarly, the bidirectional means 16 comprises a shift-left network 32 and a shift-right network 42. The bidirectional means 18 comprises a shift-left network 34 and a shift-right network 44. The bidirectional means 14 is activated by applied clock pulses $\Phi_2$ and $\Phi_4'$. In addition, bidirectional means 14 is activated by the data from both CN1 and CN2′. More particularly, the shift-left network of bidirectional means 14 is activated by clock $\Phi_4'$ and the data of CN1. The shift-right network 40 is activated by clock $\Phi_2$ and by the data on CN2′.

Bidirectional means 16 receives inputs from both CN1 and CN2. In addition, clock pulses $\Phi_2'$ and $\Phi_4$ are inputs to the bidirectional means 16.

Bidirectional means 18 receives inputs from storage elements CN2 and CN1′. It also receives input clock $\Phi_2$ and $\Phi_4'$.

Also shown in FIG. 2 are various clock pulses $\Phi_1$ and $\Phi_3$ which are applied to the storage elements CN1, CN2, CN1′, and CN2′. Clock pulses $\Phi_1$ and $\Phi_3$ will place data on storage elements CN1, CN2, CN1′ and CN2′, depending on the activation of the bidirectional means 14, 16, and 18. For instance, the placement of data on storage element CN1 by pulse $\Phi_1$ will be determined by the state of data on CN2 during a SHIFT LEFT operation. In such data shifting operation, shift-left network 32 will offset the effect of a positive clock pulse $\Phi_1$ if $\Phi_2'$ is present and if there is data (voltage) on CN2. In a SHIFT RIGHT operation, shift right network 42 controls the effect of clock pulse $\Phi_3$ on storage element CN2. That is, if CN1 contains data (voltage) and if clock pulse $\Phi_4$ is present, shift-right network 42 will offset the effect of clock pulse $\Phi_3$ on CN2. This will be seen more clearly during the discussion of the detailed circuit shown in FIG. 3.

Figure 3:
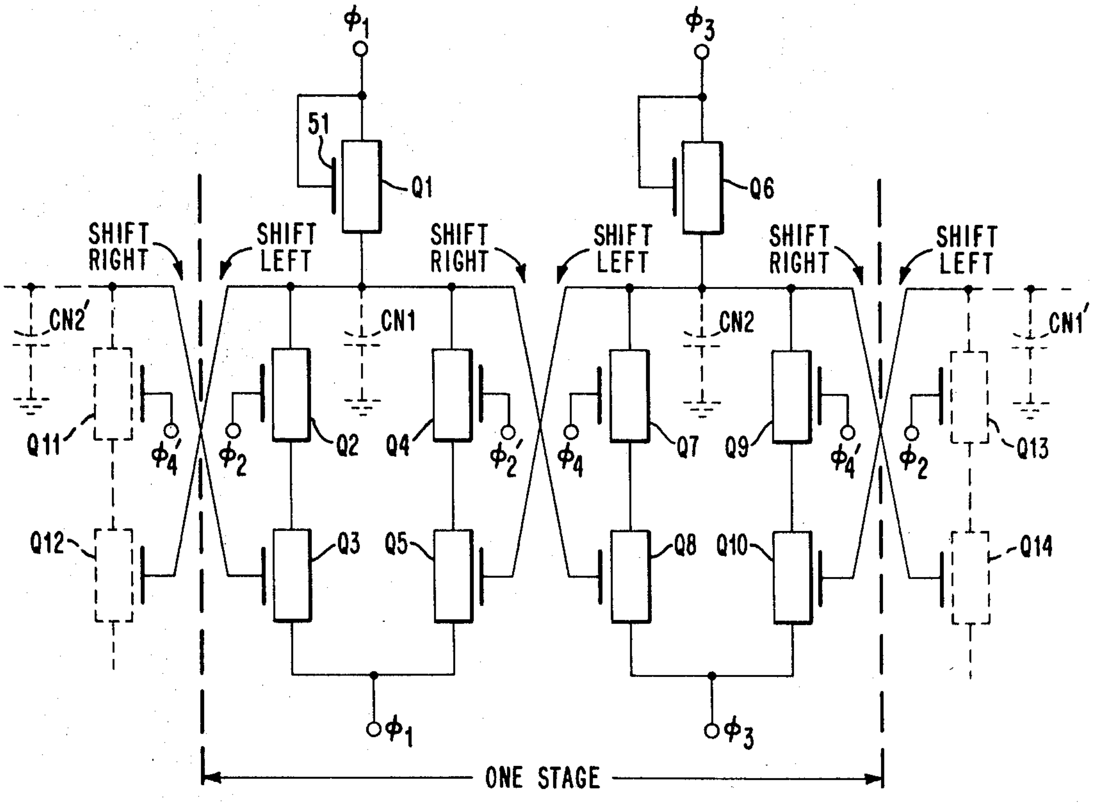
FIG. 3 is a detailed circuit diagram of a four-phase bidirectional dynamic shift register, according to the present invention.

FIG. 3 is a schematic diagram of a four-phase shift register according to the concepts shown in FIGS. 1 and 2. In particular, one stage of a bidirectional dynamic shift register is shown. In dashed lines to the left of this stage is a portion of one adjacent stage while on the right, also in dashed lines is a portion of the other adjacent stage. In order to be consistent with FIGS. 1 and 2, the same symbol representations have been used when applicable. Therefore, storage elements CN2′, CN1, CN2, and CN1′ are the same as those illustrated in FIGS. 1 and 2. Also, the applied clock pulses are the same in all figures.

The particular sections of the shift register shown in FIG. 3 are arranged to be symmetrical. That is, the first section of the stage shown in solid lines comprises transistors Q1–Q5 while the second stage comprises transistors Q6–Q10. During a complete cycle of operation, data will be transferred from the input to the stage to the output of the stage. Consequently, upon incidence of a full cycle of applied clock pulses, data will be transferred from CN2′ (the output of the previous stage) to CN2 (the output of the stage shown in solid lines), during a SHIFT RIGHT operation.

In the embodiment of FIG. 3, MOSFET's are used throughout for the bidirectional means. The storage elements are node capacitances comprised primarily of the gate-source capacitance of a switching element (MOSFET). For instance, node capacitance CN1 is primarily comprised of the gate-source capacitance of MOSFET Q8, in addition to the capacitance of the leads connecting Q1, Q2 and Q8. Similarly, node capacitance CN2′ is comprised primarily of the gate-source capacitance of switching element Q3.

MOSFETs are switching elements which have three electrodes, commonly designated the gate, source, and drain electrodes. The conductance between the source and drain electrodes is determined by the potential on the gate electrode. In a enhancement type device, a positive gate potential provides very high conductance between the output terminals, i.e., between the source and drain terminals. Of course, in the present invention it is to be understood that P-channel depletion devices could be used just as well as N-channel enhancement type devices. The matter of choice is left to the designer. Accordingly, in the preferred embodiment shown in FIG. 3, whenever there is a positive potential applied to the gate electrode of the MOSFET, there is a very low impedance between its output electrodes. If there is a negative gate bias (or no gate bias) applied to the switching element, there is a high impedance between the output terminals. In FIG. 3, the gate electrode of a MOSFET is designated by a line adjacent a "-boxlike" representation of the MOSFET; for instance, the gate electrode of MOSFET Q1 is designated 51.

FIG. 3 is a four-phase shift register using overlapping clock pulses. As will be more apparent later, the number of phases employed is not important, nor is the fact that the clock pulses are overlapping.

Connected between each storage element is a bidirectional means which is comprised of a shift-left network and a shift-right network, both of which are activated by clock pulses. In particular, the shift-left network connected to CN1 is comprised of MOSFET's Q11 and Q12. The shift-right network connected to CN1 is comprised of MOSFET's Q7 and Q8.

With respect to capacitance CN2, the switch left network connected to this capacitance is comprised of MOSFET's Q4 and Q5, while the shift-right network is comprised of MOSFET's Q13 and Q14.

Although both portions of the bidirectional means connected to capacitances CN2′ and CN1′ are not shown, the shift-right network connected to CN2′ is comprised of switching elements Q2 and Q3. The shift-left network connected to capacitance CN1′ is comprised of switching elements Q9 and Q10.

By referring to FIGS. 2 and 3 together, it is apparent that any bidirectional means is comprised of circuitry which has as its inputs clock pulses and the data on the connected storage elements. For instance, the shift-left network connected to CN2 is comprised of switching elements Q4 and Q5. This network has as inputs a clock pulse $\Phi_2'$ and the data state of CN2.

By referring again to both FIGS. 2 and 3, it is apparent that a shift-left or a shift-right network affects the charge on a capacitance to which data is to be transferred by creating a discharge path for the data written into the transferee capacitance. For instance, Q4 and Q5 comprise the shift-left network connected to capacitance CN2. Switching elements Q4 and Q5 are a series-connected discharge path for CN1. If data is applied to CN1 by the incidence of pulse $\Phi_1$, this data will be discharged through Q4 and Q5 if input $\Phi_2'$ is present and the voltage across CN2 is high. This is apparent if it is remembered that a positive gate bias will render a MOSFET conductive between its output terminals. Consequently, the function of the bidirectional means is to allow the state of the capacitance from which information is to be transferred to conditionally control the data state of the capacitance to which information is transferred. This is a conditional control since it depends on the data on the transferor capacitance. If there is no voltage across the transferor capacitance, there will be a break in the discharge path and any data applied to the transferee capacitance by a clock pulse will remain on that capacitance. In this discussion, data is either an "up" level or a "down" level of voltage. If depletion type devices were used then a low-voltage state on a capacitance would be required to make a complete discharge path.

Figure 6:
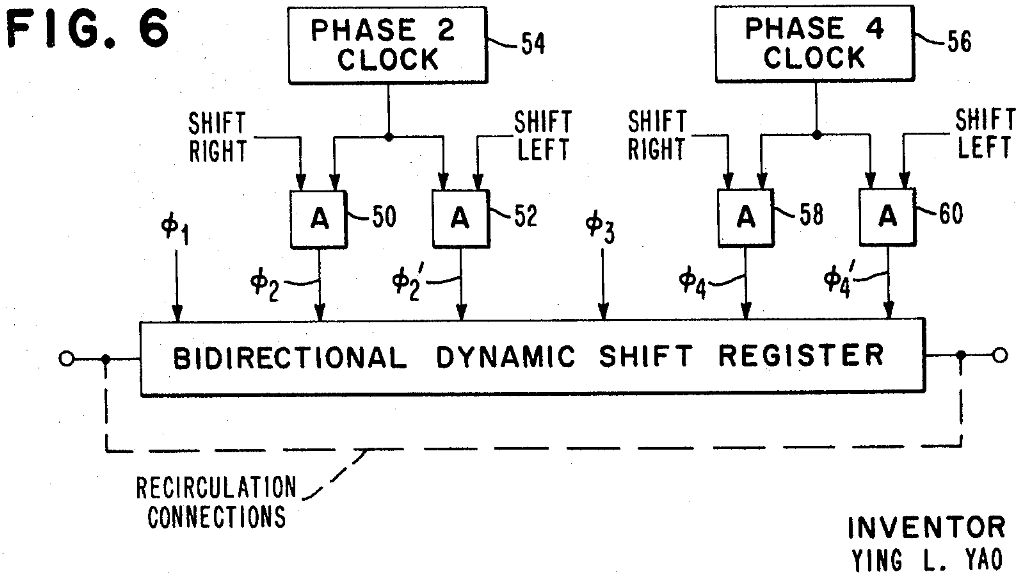
FIG. 6 is a schematic illustration of the use of logic gates to derive additional clock pulses from a single clock generator.

The various clocking pulses $\Phi_1$, $\Phi_2$, $\Phi_3$, $\Phi_4$, $\Phi_2'$, and $\Phi_4'$ are applied to the bidirectional means and to the storage elements. Application of the clock pulses select either a shift-left or a shift-right network connected to each storage element, depending upon whether data is to be shifted to the left or to the right. In addition, the clock pulses $\Phi_1$ and $\Phi_3$ are used to charge storage capacitances. As will be apparent in more detail later, clock pulses $\Phi_2$ and $\Phi_2'$ are identical while clock pulses $\Phi_4$ and $\Phi_4'$ are identical. The only difference between these is that $\Phi_2'$ is directed to a different location than $\Phi_2$ and $\Phi_4'$ is directed to a different location than $\Phi_4$. However, these clock pulses can be derived from the same clock generators, as will be more apparent when the circuitry of FIG. 6 is discussed. The operation of the circuit of FIG. 3 will now be described in more detail. In particular, a SHIFT LEFT operation and a SHIFT RIGHT operation will be explained. In order to fully understand this operation, reference will be made to FIGS. 3, 4, and 5.

Shift-Right Operation

Figure 4:
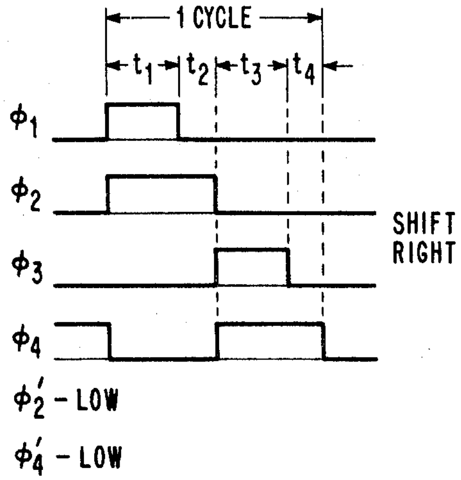
FIG. 4 is a timing chart for a SHIFT RIGHT operation of the shift register of FIG. 3.

For a SHIFT RIGHT operation, the timing chart shown in FIG. 4 is used. A complete cycle of operation involves clock pulses $\Phi_1$, $\Phi_2$, $\Phi_3$, and $\Phi_4$. Clock pulses $\Phi_2'$ and $\Phi_4'$ are not present during a SHIFT RIGHT operation. This complete cycle of applied clock pulses will enter data into a stage and provide such data on the output of the stage. Because there is phase inversion of the input signal by each section, two storage elements are needed per stage in this particular circuit. For instance, if there is a high-voltage state ("1") on capacitance CN2′, this will be transferred to capacitance CN1 as a low voltage ("0"), and will be transferred from CN1 to CN2 as a high voltage ("1"). Consequently, two storage elements are required in order to reestablish the proper data input.

For a SHIFT RIGHT operation, the following occurs:

1. Clock pulses $\Phi_1$ and $\Phi_2$ are present while $\Phi_3$ and $\Phi_4$ are low. This means that capacitance CN1 will be charged through Q1 to the value of $\Phi_1$. If CN2′ is a low-voltage state during time $t_1$, there will not be a discharge path through Q2 and Q3 for the voltage on CN1.

2. During time period $t_2$, $\Phi_1$, $\Phi_3$, and $\Phi_4$ are low, while $\Phi_2$ is high. During this time, CN1 will be discharged through Q2 and Q3 if the data input is high. If the data input is low, CN1 will remain charged because Q3 is not conducting. Consequently, during $t_1$ and $t_2$, data is entered into the shift register stage. This data entered onto CN1 is conditionally regulated by the data on CN2′.

3. During time period $t_3$, $\Phi_1$ and $\Phi_2$ are low while $\Phi_3$ and $\Phi_4$ are high. The presence of pulse $\Phi_3$ will charge up node capacitance CN2 through Q6.

4. During time period $t_4$, $\Phi_4$ is the only clock pulse which is up. During this time period, CN2 will be discharged through Q7 and Q8 if the voltage on CN1 is up. If the voltage on CN1 is low (because the data input to this stage was originally high) CN2 will remain charged. This completes a shift of any data from the input to the output of this stage. That is, after the duration of clock pulses $\Phi_1$–$\Phi_4$, data has been shifted from CN2′ to CN2.

During the SHIFT RIGHT operation, only the shift-right network of each bidirectional means was used. The shift-left networks were disconnected from the node capacitances during the SHIFT RIGHT operation. For instance, since $\Phi_2'$ was low during a SHIFT RIGHT operation, Q4 was in a nonconducting state. This meant that the voltage state across CN2 did not affect the voltage state on CN1 during a SHIFT RIGHT operation. That is, there would not be a discharge path through Q4 and Q5 for CN1 during a SHIFT RIGHT cycle. Similarly, since $\Phi_4'$ was low during the SHIFT RIGHT cycle, the status of the voltage across CN1′ could not regulate the voltage on CN2.

Shift-Left Operation

Figure 5:
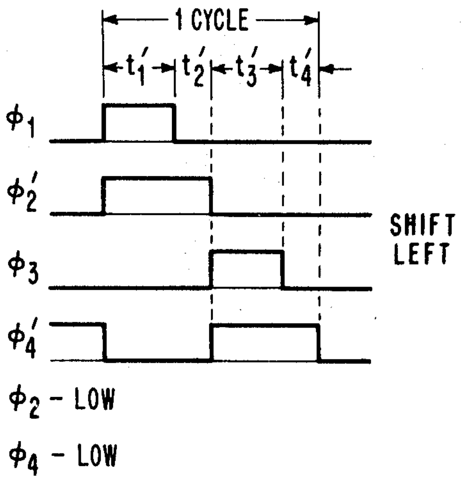
FIG. 5 is a timing chart for a SHIFT LEFT operation of the bidirectional shift register of FIG. 3.

The timing chart for a SHIFT LEFT operation is shown in FIG. 5. Here clock pulses $\Phi_1$, $\Phi_2'$, $\Phi_3$, and $\Phi_4'$ are used. Clocks $\Phi_2$ and $\Phi_4$ are kept low. In the SHIFT LEFT operation, the shift-left networks 30, 32, and 34 will be used, while the shift-right networks 40, 42, and 44 will be electrically disconnected from transferee node capacitances.

Here, data will be transferred from CN1' to CN1 during a complete cycle of operation. A complete cycle includes application of the sequence of pulses $\Phi_1$, $\Phi_2'$, $\Phi_3$ and $\Phi_4'$; it will be noted that the sequence of applied pulses is the same as that for a SHIFT RIGHT operation. The only difference is that the pulses $\Phi_2$ and $\Phi_4$ are rerouted to different elements during a SHIFT LEFT operation. However, they are identical to the $\Phi_2$ and $\Phi_4$ pulses, respectively.

The operation of the circuit of FIG. 3 during a SHIFT LEFT operation is as follows:

1. During time period $t_1'$, clock pulses $\Phi_1$ and $\Phi_2'$ are present. Pulses $\Phi_3$ and $\Phi_4'$ are low. Since clock $\Phi_1$ is up, capacitance CN1 will be charged. Clock $\Phi_2'$ will cause switching element Q4 to be of low impedance, but if there is no data on CN2, then Q5 will have high impedance. This means that the data will remain on CN1. During the SHIFT LEFT operation, $\Phi_2$ and $\Phi_4$ are low, so elements Q2 and Q7 will be of high impedance. This means that the shift-right network of the bidirectional means will be electrically disconnected during a SHIFT LEFT operation.

2. During time period $t_2'$, $\Phi_2'$ is up while all other clock pulses are low. During this time period, data on CN1 will be influenced by the state of data on CN2. That is, there will be a discharge path for CN1 through Q4 if the data on CN2 is high. During $t_2'$, the state of the voltage across CN1' will not control the state of the data on CN2. This is because $\Phi_4'$ is low during $t_2'$, so that a discharge path for CN2 is not provided through Q9 and Q10.

3. During $t_3'$, $\Phi_3$ and $\Phi_4'$ are up, while $\Phi_1$ and $\Phi_2$ are low. Since $\Phi_3$ is up, CN2 will be charged through Q6.

4. During $t_4'$, $\Phi_4'$ is the only clock pulse which is up. Therefore, the state of voltage on CN2 voltage on CN2 will be controlled by that across CN1', during this time period. Because $\Phi_4'$ is up, a discharge path for CN2 will be provided through Q9 and Q10 if the voltage level on CN1' is high. Similarly, the data on node CN1 is in control of the data on CN2' during this time period. Since $\Phi_2'$ is low, the state of CN2 will not control the state of CN1.

It is apparent that, for both a SHIFT RIGHT operation and for a SHIFT LEFT operation, data will be entered into a stage and shifted in serial fashion. The data will be shifted from one node capacitance to another before data is shifted to that capacitance from still another capacitance.

A SHIFT RIGHT, followed by a SHIFT LEFT, or the reverse of these two operations, will produce substantially no shifting of data. This will be a STORE operation. This is desirable in some applications as a means for keeping the stored data from being destroyed due to the leakage current. For example, clock pulses $\Phi_1$, $\Phi_2'$, $\Phi_3$ and $\Phi_4$ applied in sequence will cause the data to shift from CN2 to CN1 and then return to CN2. Clock pulses $\Phi_1$, $\Phi_2'$, $\Phi_3$, and $\Phi_4'$ will cause a data shift from CN2 to CN1', followed by a return to CN2. Either clock sequence can be used as a technique to store the data, it being important to note only that the sequence of pulses chosen causes a shift in one direction followed by a shift in the opposite direction.

The clock inputs $\Phi_2$ and $\Phi_2'$ are identical waveform inputs. However, for a SHIFT RIGHT operation, the phase 2 clock pulse is directed to the gate electrode of switching element Q2 while for a SHIFT LEFT operation, the phase 2 clock pulse is directed to switching element Q4. With respect to the phase 4 clocking pulses, the same situation is true. That is, clock pulses $\Phi_4$ and $\Phi_4'$ are identical waveforms. The phase 4 clock pulse is directed to the gate electrode of switching element Q7 during a SHIFT RIGHT operation, while it is directed to the gate electrode of switching element Q9 during a SHIFT LEFT operation.

FIG. 6 shows a circuit which will enable a single clock generator to produce pulses for both a SHIFT RIGHT and a SHIFT LEFT operation. In this drawing, phase 2 clock is combined with other circuitry to ultimately produce both $\Phi_2$ and $\Phi_2'$. The phase 4 clock is combined with its associated circuitry to produce both $\Phi_4$ and $\Phi_4'$.

In FIG. 6, the bidirectional dynamic shift register is the circuit shown in FIG. 2, having any number of stages. Clock pulses $\Phi_1$ and $\Phi_3$ are provided to this shift register. To provide clock pulses $\Phi_2$ and $\Phi_2'$, logic circuitry consisting of AND gates 50, 52 is utilized. The phase 2 clock 54 provides output pulses which are directed to these AND gates. A control signal is applied to each of the AND gates, together with the pulses from the phase 2 clock. One control pulse is for a "shift right" while the other control is for a "shift left." Depending upon the incidence of these control pulses, which will not occur simultaneously, either a $\Phi_2$ clock pulse or a $\Phi_2'$ clock pulse will be produced.

The same concept is used to provide $\Phi_4$ and $\Phi_4'$. Phase 4 clock 56 produces output pulses which are directed to AND gates 58, 60. Also directed to these AND gates are control pulses. The control pulse directed to AND gate 58 is the "shift right" pulse, while the control pulse directed to AND gate 60 is the "shift left" control pulse. These control pulses are the same as those used as inputs to AND gates 50 and 52. As when the control pulses are applied to AND gates 50 and 52, the control pulses applied to AND gates 58 and 60 are not coincident in time. The output of AND gate 58 is the clock pulse $\Phi_4$, while the output of AND gate 60 is the clock pulse $\Phi_4'$.

In fabricating this bidirectional dynamic shift register on a single chip, the logic gates can be fabricated on the same chip. This provides economy of circuit layout and only a single phase 2 clock and a single phase 4 clock are required. Only a very small amount of chip area is required by the addition of these AND gates.

In FIG. 6 recirculation connections are also shown. These are connections from the output of the shift register to the input of the register. The recirculation connections are utilized to reenter in serial form the data which is in the shift register. These are known connections and do not form part of the present invention. However, it is to be recognized by those of skill in the art that the recirculation connections could be applied to the bidirectional shift register disclosed herein.

It is also clear to one of skill in the art that the concepts set forth herein apply whether the clock pulses are overlapping or nonoverlapping. The principles also apply no matter how many clock phases are used. What has been shown is a novel bidirectional shift register having a plurality of means for providing conditional regulation between adjacent node capacitances in the direction of data flow. That is, means are provided which enable the control of a node capacitance by the state of another node capacitance. In actual operation, the node capacitance to which information is to be transferred is charged and then conditionally discharged by the state of the node capacitance from which information is transferred. In this manner, data can be shifted to the right or left depending upon the particular clock pulses impressed.

Figure 8:
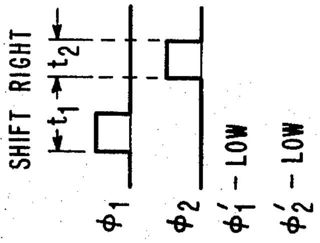
FIGS. 8 and 9 are timing charts for the shift register of FIG. 7.
Figure 9:
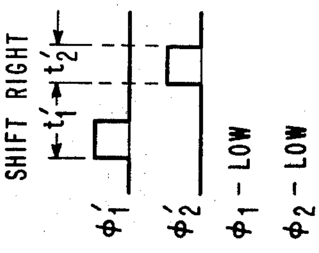
Figure 7:
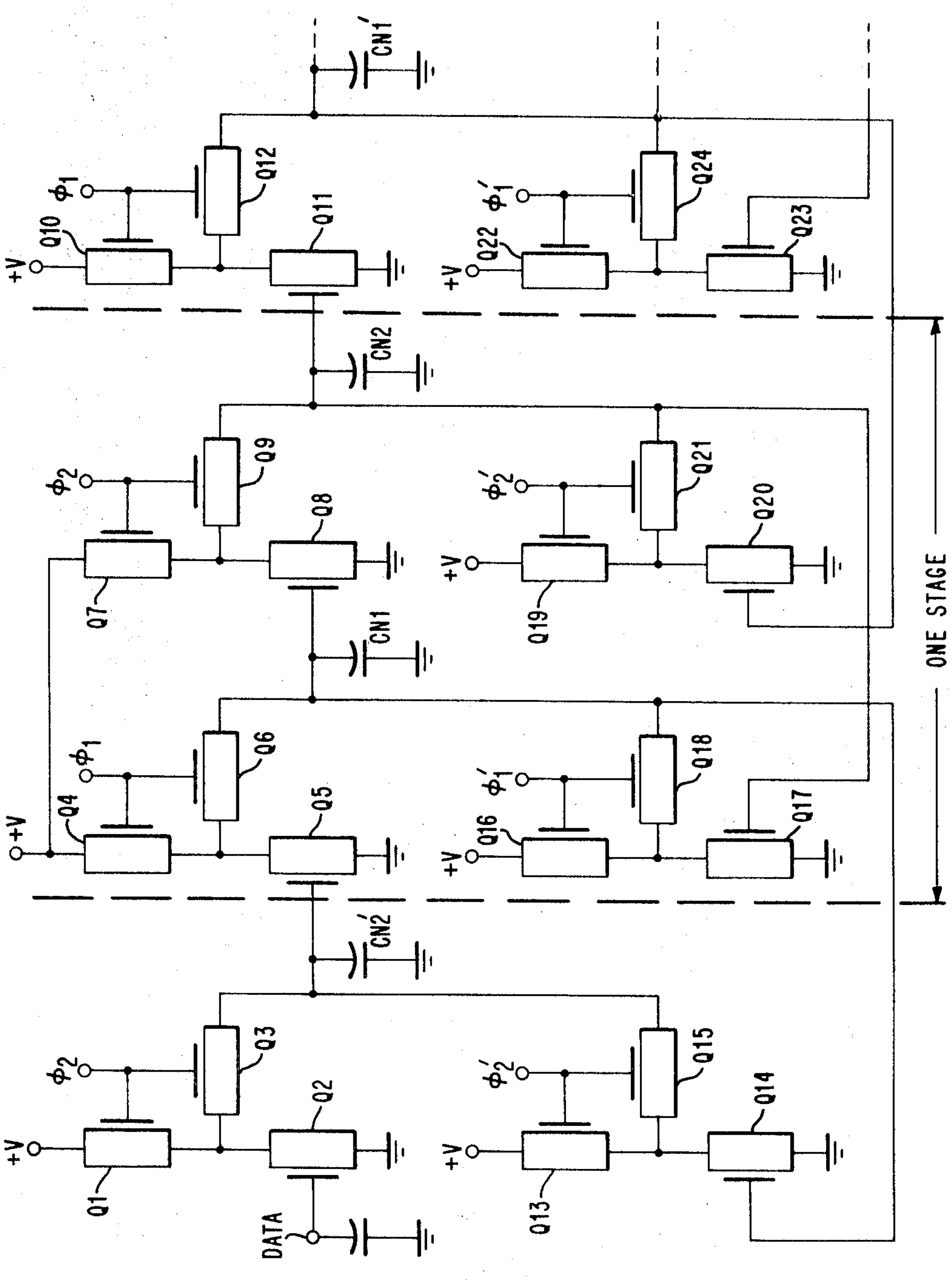
FIG. 7 is a detailed circuit diagram of a two-phase bidirectional dynamic shift register according to the subject invention.

FIG. 7 shows a bidirectional dynamic shift register using a two-phase, nonoverlapping clock scheme. The timing chart for operation of this circuit are shown in FIGS. 8 and 9.

In FIG. 7, a stage, such as that shown, comprises storage elements CN1 and CN2. Storage element CN2' is the output storage element of the preceding stage, while capacitance CN1' is the input capacitance of the next stage. As before, the switching elements Q1–Q24 are MOSFET's. Various clock pulses $\Phi_1$, $\Phi_2$, $\Phi_1'$, and $\Phi_2'$ are provided.

Located between each storage capacitance, in this case node capacitances, are bidirectional means which control the direction of flow of data in the shift register.

Shift-Right Operation

For a SHIFT RIGHT operation, clock pulses $\Phi_1$ and $\Phi_2$ are used. Clock pulses $\Phi_1'$ and $\Phi_2'$ are kept low. The operation of the circuit when data is shifted to the right is the following:

1. During time period $t_1$, clock pulse $\Phi_1$ is up and pulse $\Phi_2$ is down. During $t_1$, node capacitance CN1 will be conditionally charged through Q4 and Q6. The charge placed on CN1 will be conditional, depending on the data input at CN2'. If there is a high voltage across CN2' (indicative of a "1"), CN1 will not charge up to V because there will be a direct path to ground through Q4 and Q5. If there is no voltage on CN2' (indicating a "0"), CN1 will be charged to V.

2. During time period $t_2$, $\Phi_2$ is up while $\Phi_1$ is down. This means that CN2 will be conditionally charged through Q7 and Q9. This will be a conditional charge, since it will depend upon the voltage state across CN1. If the voltage state across CN1 is high, CN2 will not charge because there will be a direct path to ground through Q7 and Q8. Assuming that the data input at CN2' was initially high, the state of CN1 will be low at the end of time period $t_1$ and the state of CN2 will be high at the end of time period $t_2$. This will transfer data from the input of the shift register stage to the output of that stage. Similarly, if the original data input at CN2' were low, the voltage state across CN1 would be high at the end of time period $t_1$, while the voltage state across CN2 would be low at the end of time period $t_2$.

For a SHIFT LEFT operation, clock pulses $\Phi_1'$ and $\Phi_2'$ are used. Clock pulses $\Phi_1$ and $\Phi_2$ remain low. Operation of the circuit when data is shifted to the left is the following:

1. During time period $t_1'$, $\Phi_1'$ is up while $\Phi_2'$ is down. Therefore, CN1 will be conditionally charged through Q16 and Q18. The charge placed on CN1 will depend on the voltage state on CN2. If there is a high voltage across CN2, this will cause Q7 to be conducting and there will be a direct path to ground through Q16 and Q17. Therefore, the bias applied to Q16 will not charge CN1. If the voltage state on CN2 is low during time period $t_1'$, then there will not be a path to ground from the power supply through Q16 to Q17. In this case CN1 will charge up to the value V.

2. During time period $t_2'$, $\Phi_2'$ is up while $\Phi_1'$ is down. CN2 will now be charged, depending upon the voltage state across CN1'. Charging of CN2 will occur through Q19 and Q21. If there is a high voltage across CN1', then there will be a direct path to ground through Q19 and Q20 and CN2 will not be charged to a high value. If the voltage state across CN1' is low during $t_2'$, then CN2 will charge to V during $t_2'$.

Accordingly, it is readily apparent that the voltage state of any node capacitance is determined by the voltage state across the capacitance from which information is to be transferred. Under control of the clock pulses, either a shift left network is used or a shift right network is used to control the flow of data. As is the case with the circuit of FIG. 3, the pulses $\Phi_1$ and $\Phi_1'$ are identical and can be derived from the same clock generator. The same is true with respect to clock pulses $\Phi_2$ and $\Phi_2'$.

What has been presented is a bidirectional dynamic shift register which enables shifting of data in either direction in response to the application of clock pulses. The same sequence of clock pulse is used for both directions of data flow. Each section of the shift register controls the data information state of the section to which information is to be transferred. From the foregoing examples, it is readily apparent to one of skill in the art that the concepts described here can be applied to virtually any shift register. The exact clocking scheme and the particular type of data retention elements employed are purely the choice of the designer.

Also, it is readily apparent that a bidirectional means, or a portion thereof, can be placed between any two storage elements. In this case, there will be conditional regulation of storage elements by nonadjacent storage elements. Such an arrangement may be useful when it is desired to reenter data at a previous location in the shift register, which is not an adjacent location. To perform such an operation, it is only necessary to apply the proper clock pulses.

What is claimed is:

1. A dynamic shift register for shifting data in two directions, comprising:

a plurality of interconnected stages having means for storage of data therein, each stage being comprised of field effect devices, said stages having means for receiving data impulses from the left-hand adjacent stage and means for receiving data impulses from the right-hand adjacent stage;

left shift means comprised of field effect devices connected between said stages for transferring data from each stage to its left-hand adjacent stage, said left shift means having inputs for receiving data impulses stored on said stage for receiving control pulses applied thereto for regulation of data impulses to be shifted from each stage to its adjacent left-hand stage;

right shift means comprised of field effect devices connected between said stages for transferring data from each stage to its right-hand adjacent stage, said right shift means having inputs for receiving data stored on said stage for receiving control pulses applied thereto for regulation of data impulses to be shifted from each stage to its adjacent right-hand stage;

control means for applying clock pulses to said right and left shift means and for writing data impulses into said stages during application of said control pulses, wherein said shift means provides a conductive path for removal of data impulses from a stage to which data is to be transferred in response to the coincident application of a clock pulse and a data impulse from another stage from which data is to be transferred.

2. The register of claim 1, wherein said means for storage is a capacitance associated with said field effect devices and each said shift means comprises a circuit path for selectively discharging said capacitance in response to the coincident input of clock pulses and data impulses from a preceding stage from which data is to be shifted.

3. The register of claim 2, wherein each said circuit path is comprised of field effect devices having gate electrodes, said clock pulses and said data impulses from the preceding stage being applied to said gate electrodes during said shifting operation.

4. The register of claim 1, wherein each said capacitance is connected to said control means for selective application of clock pulses thereto, each said capacitance being connected to adjacent left and right capacitances by said shifting means, said shifting means being comprised of two field effect devices one of which is responsive to said clock pulses while the other is responsive to the voltage on an adjacent capacitance.

5. A bidirectional shift register, comprising:

a plurality of bit storage positions, each position comprising:

two groups of field effect devices, each group including a first field effect device capable of storing a signal on the gate thereof due mainly to the gate-substrate capacitance of said first device;

means connected each said first field effect device to the other group in said bit position;

said field effect devices in each group being connected serially to said capacitances, said serial connections providing discharge paths for the signal on said capacitances in response to the simultaneous input of control pulses and signal voltages from adjacent capacitances applied to the gate electrodes of said field effect devices in said serial connections;

means for connecting each said group to the adjacent bit position;

means for applying control pulses to the field effect devices in each said group;

voltage means for selectively applying voltage signals to the gate electrodes of said first field effect devices.

6. The register of claim 5, circuit, comprising: means applies a sequence of control pulses to field effect devices in each bit position, said control pulses writing data bits into each bit storage position in accordance with the data state of a bit position from which data is to be transferred.

7. A bidirectional shift register circuit, comprising:

a plurality of capacitances for storage of voltage pulses thereon;

means for applying voltage pulses to said capacitances;

at least two discharge paths for the voltages on each capacitance, said discharge paths being comprised of field effect devices connected in series a first field effect device in each said path having its gate electrode connected to a capacitance from which data is to be shifted and a second field effect device in said path having a gate electrode to which control pulses are applied;

control means connected to the gate electrodes of said second field effect devices in each said discharge path for providing control pulses to said second field effect devices, each said discharge path being rendered conductive by the application of a control pulse to said second field effect device and the coincident application to the gate electrode of said first field effect device of a voltage on a capacitance from which data is to be shifted, there being discharge paths for each capacitance which are selectively rendered conductive in response to the voltage state of at least two other capacitances.

8. The circuit of claim 7, wherein each said capacitance arises mainly from the interelectrode capacitance of a field effect device in each said discharge path.

9. The circuit of claim 8, wherein the discharge paths for any capacitance are connected in parallel and are rendered conductive by the application of different control pulses and voltages from different other capacitances, said discharge paths being used for shifting data in opposite directions from each said capacitance.

10. An electric storage circuit, comprising:

first and second sections, each of which can store data therein, each said section being comprised of:

first and second field effect devices connected in series, each said first field effect device being capable of storing data as voltage pulses on its gate electrode;

third and fourth field effect devices connected in series, said third field effect device being capable of storing data as voltage pulses on its gate electrode;

a voltage source for applying voltage pulses to the gate electrodes of said first and third field effect devices;

means selectively connecting said first and third field effect devices to said voltage source;

control means for applying clock pulses to the gate electrodes of said second and fourth field effect devices to render said devices conductive, said control means producing clock pulses coincidentally with the application of said voltage pulses from said voltage source.

11. The circuit of claim 10, wherein said means for selectively connecting said first and third field effect devices to said voltage source comprises further field effect devices connected in series to said first and third field effect devices, respectively, said further field effect devices having their gate electrodes connected to said voltage source.

12. The circuit of claim 11, wherein said first and second sections are interconnected, the gate electrodes of said first and third field effect devices being connected to said voltage source.

13. The circuit of claim 11, further including an input terminal connected to the gate electrode of said third field effect device in said first section, and an output terminal connected to the gate electrode of the first field effect device in said first section.

14. The circuit of claim 12, wherein said first and second and said third and fourth field effect devices in each section are connected together to form a series connected loop, each said loop being connected to said voltage source and to the gate electrode of said first field effect device in said other section.

15. The circuit of claim 10, where said voltage source applies time-spaced voltage pulses to said first and third field effect devices, said voltage pulses being coincident in time with selected ones of said clock pulses from said control means.

16. A bidirectional shift register circuit, comprising:

a plurality of stages for storage of data therein, each stage being comprised of field effect devices;

a first storage field effect device in each stage being capable of storing data as voltages on its gate electrode;

a second storage field effect device in each stage being capable of storing data as voltage pulses on its gate electrode, the data state of said second field effect device being the data state of said stage;

first discharge paths connected to said first storage field effect devices and to said second storage field effect device, said first discharge paths having a control input from a storage field effect device in said stage and a control input on which clock pulses are applied, the coincident application of said control inputs rendering said paths conductive;

second discharge paths connected to said first storage field effect device and to said second storage field effect device, each said second discharge path having a control input from a storage field effect device in another stage and a control input on which clock pulses are applied, the coincident application of said control inputs to said second discharge paths rendering said second paths conductive;

control means for applying said clock pulses to said discharge paths;

voltage means for selectively applying voltage pulses to the gates of said first and second storage field effect devices for establishing data thereon.

17. The circuit of claim 16, wherein said discharge paths are comprised of field effect devices arranged in series, the gate electrodes of said field effect devices being the control inputs to said discharge paths.

18. The circuit of claim 17, including means comprising field effect devices for selectively connecting said voltage means to said storage devices.

19. The circuit of claim 17, where said discharge paths are connected in parallel to the gate electrode of each said storage field effect device.

20. A bidirectional shift register, comprising:

a plurality of interconnected stages each of which is capable of storing data, each said stage comprising:

first and second series arrangements of field effect devices, each said series arrangement having a storage field effect device capable of storing voltage pulses on its gate electrode, said first and second series arrangements being cross-coupled to one another;

third and fourth series arrangements of field effect devices, said third arrangement being connected to one of said storage field effect device in said stage and said fourth series arrangement being connected to the other said storage field effect device in said stage, said third and fourth series arrangements being also connected to storage field effect devices in other stages;

voltage means for applying voltage pulses to the gate electrodes of said storage devices in each stage;

control means for applying clock pulses to said series arrangements in each stage.

21. The circuit of claim 20, where said voltage means includes another field effect device for selectively connecting said voltage means to said storage field effect devices in each stage.

22. The circuit of claim 20, where said field effect devices in each series arrangements having gate electrodes as control inputs, the gate electrode of the storage field effect device in each series arrangement being connected to a terminal of said cross-coupled series arrangements.

23. The circuit of claim 22, wherein there are two field effect devices in each series arrangement, one of which is connected to said control means for receipt of clock pulses on its gate electrode for shifting of data.

24. The circuit of claim 23, where said first and second series arrangements have control inputs for receiving clock pulses from said control means and control inputs for receiving data on the gate electrode of a storage field effect device in said stage, said third and fourth series arrangements being comprised of field effect devices having their gate electrodes connected to storage field effect devices in adjacent stages.